(12) United States Patent
Sorbonne et al.

(10) Patent No.: US 12,546,986 B1
(45) Date of Patent: Feb. 10, 2026

(54) APPARATUS FOR REMOTELY ADJUSTING SCOPE MAGNIFICATION

(71) Applicants: Arrius Sorbonne, Layton, UT (US); Benjamin Latham Griffith, Salt Lake City, UT (US)

(72) Inventors: Arrius Sorbonne, Layton, UT (US); Benjamin Latham Griffith, Salt Lake City, UT (US)

( * ) Notice: Subject to any disclaimer, the term of this patent is extended or adjusted under 35 U.S.C. 154(b) by 17 days.

(21) Appl. No.: 18/527,095

(22) Filed: Dec. 1, 2023

Related U.S. Application Data

(60) Provisional application No. 63/385,715, filed on Dec. 1, 2022.

(51) Int. Cl.
*F41G 1/38* (2006.01)
*G02B 23/16* (2006.01)

(52) U.S. Cl.
CPC ............... *G02B 23/16* (2013.01); *F41G 1/38* (2013.01)

(58) Field of Classification Search
CPC .................................. G02B 23/16; F41G 1/38
USPC .................. 74/99 R; 42/119, 122, 123, 125; 359/694, 428, 422; 33/298
See application file for complete search history.

(56) References Cited

U.S. PATENT DOCUMENTS

| | | | |
|---|---|---|---|
| 2,416,697 A * | 3/1947 | Kaiser | G02B 7/28 359/422 |
| 4,952,041 A | 8/1990 | Sandall | |
| 5,180,875 A | 1/1993 | Berry | |
| 5,276,554 A | 1/1994 | Nassivera | |
| 5,388,005 A | 2/1995 | Wilson | |
| 5,528,847 A | 6/1996 | Fisher | |
| 5,930,934 A * | 8/1999 | Fisher | F41G 1/38 42/122 |
| 6,226,880 B1 | 5/2001 | Pitre | |
| 6,519,083 B2 | 2/2003 | Heinrich | |
| 7,246,461 B2 | 7/2007 | Wooden | |
| 7,552,559 B2 | 6/2009 | Day | |
| 10,161,718 B2 | 12/2018 | Plumb | |

* cited by examiner

*Primary Examiner* — T. Scott Fix
(74) *Attorney, Agent, or Firm* — Lightfoot & Alford PLLC

(57) ABSTRACT

An apparatus has a ring adapter coupled to a magnification adjustment ring of a scope and a slider assembly carried on a portion of a firearm spaced from the adapter. The slider assembly has a slider configured for longitudinal translation relative to the firearm and has at least one front pulley located forward of the slider, and a pair of rear pulleys are located below the ring adapter. A cable couples the slider to the ring adapter, the cable extending from one portion of the ring adapter and around one of the rear pulleys, the cable then extending forward and around the front pulley and then rearward and around the other of the rear pulleys to another portion of the ring adapter. The slider is coupled to the cable, so that translation of the slider causes motion of the cable about the pulleys and corresponding rotation of the ring adapter.

6 Claims, 14 Drawing Sheets

APPARATUS FOR REMOTELY ADJUSTING SCOPE MAGNIFICATION

CROSS-REFERENCE TO RELATED APPLICATIONS

This patent application claims the benefit of the filing date of U.S. 63/385,715, filed on 1 Dec. 2022 and titled "APPARATUS FOR REMOTELY ADJUSTING SCOPE MAGNIFICATION," the entire content of which is hereby expressly incorporated by reference.

BACKGROUND

Telescopic sights ("scopes") for firearms may have adjustable magnification, which is usually adjusted via a rotating ring near the eyepiece. A user typically rotates the ring by grasping the ring, though a lever or similar protruding component may be coupled to the ring to aid in manual adjustment. These methods of adjustment require the user to remove a hand from gripping the firearm to rotate the ring, which may lead to a missed shot during the adjustment motions.

DETAILED DESCRIPTION

Figure 1:
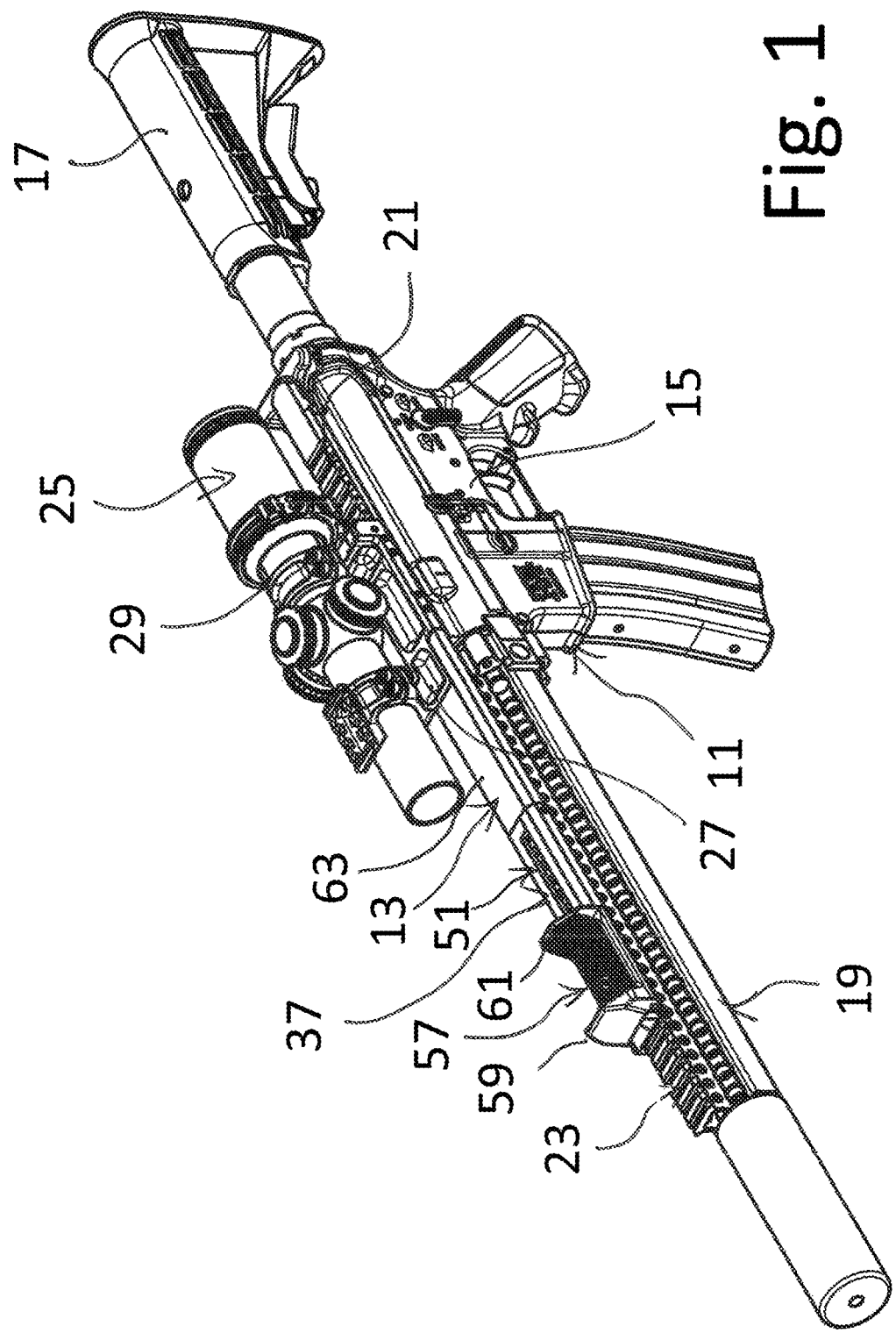
FIG. 1 is an oblique view of a firearm with an embodiment of an apparatus according to this disclosure for remotely adjusting scope magnification.
Figure 2:
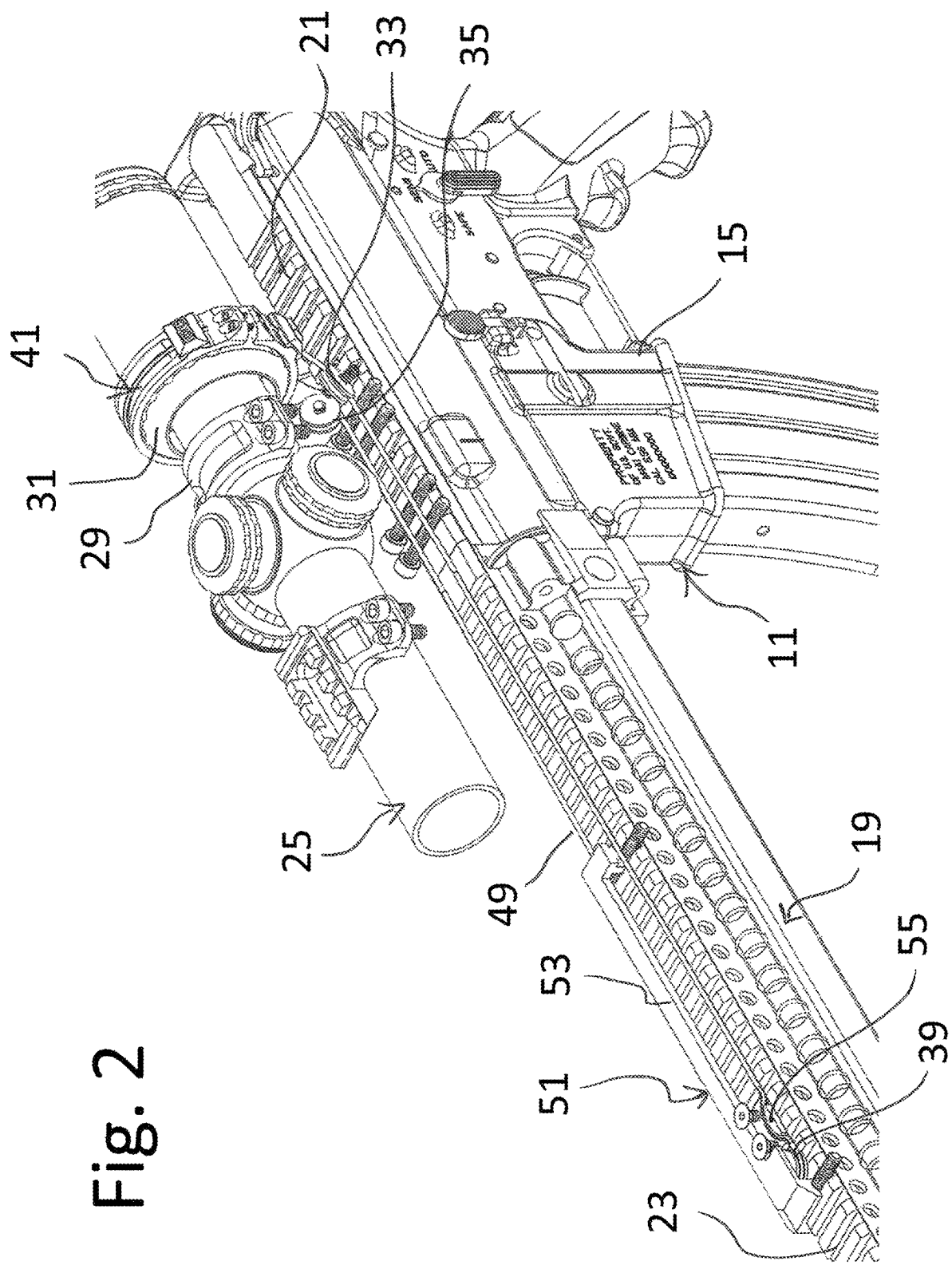
FIG. 2 is an oblique view of a portion of the firearm of FIG. 1 with components removed for ease of viewing.
Figure 3:
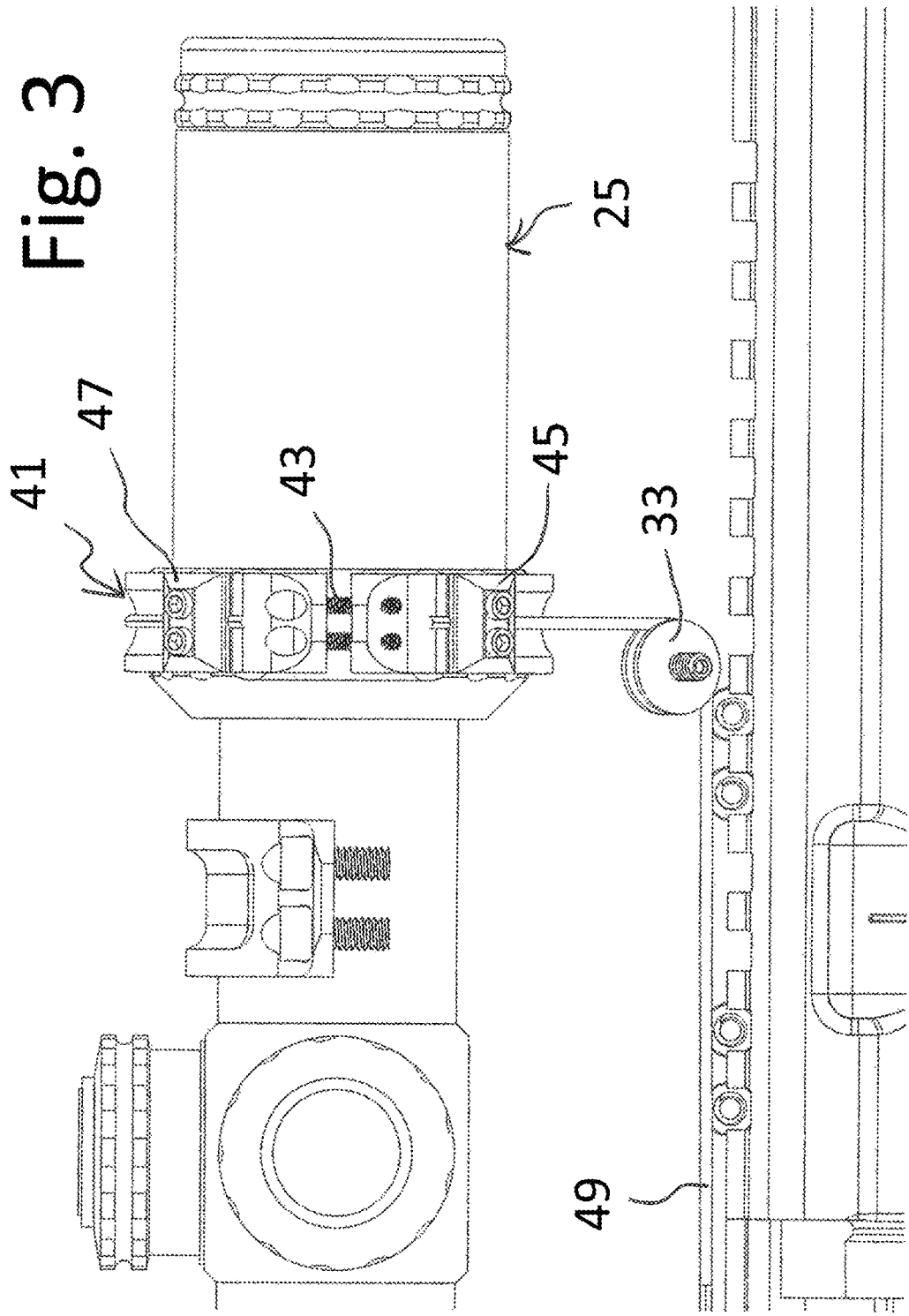
FIG. 3 is a side detail view of portions of the apparatus of FIG. 1.
Figure 4:
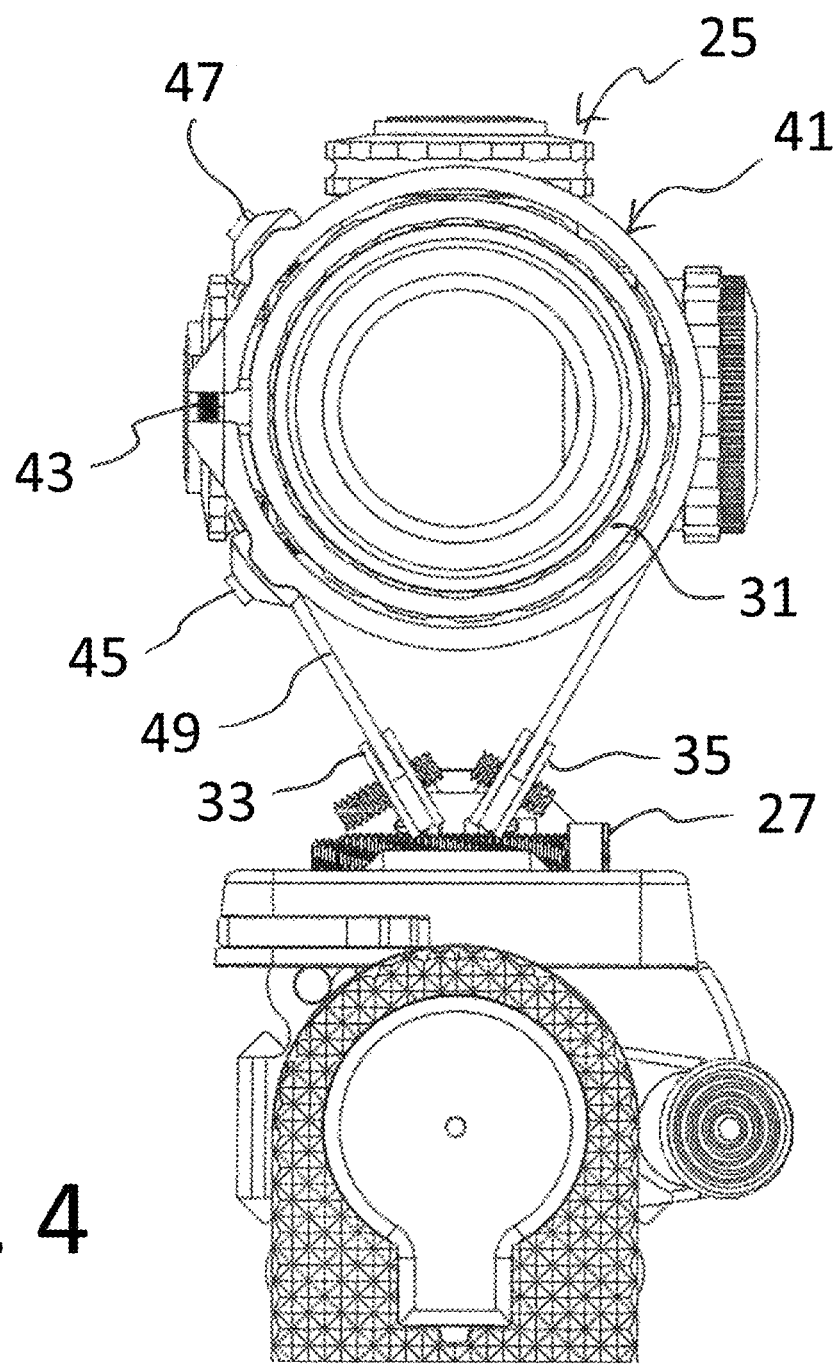
FIG. 4 is a rear detail view of portions of the apparatus of FIG. 1.
Figure 5:
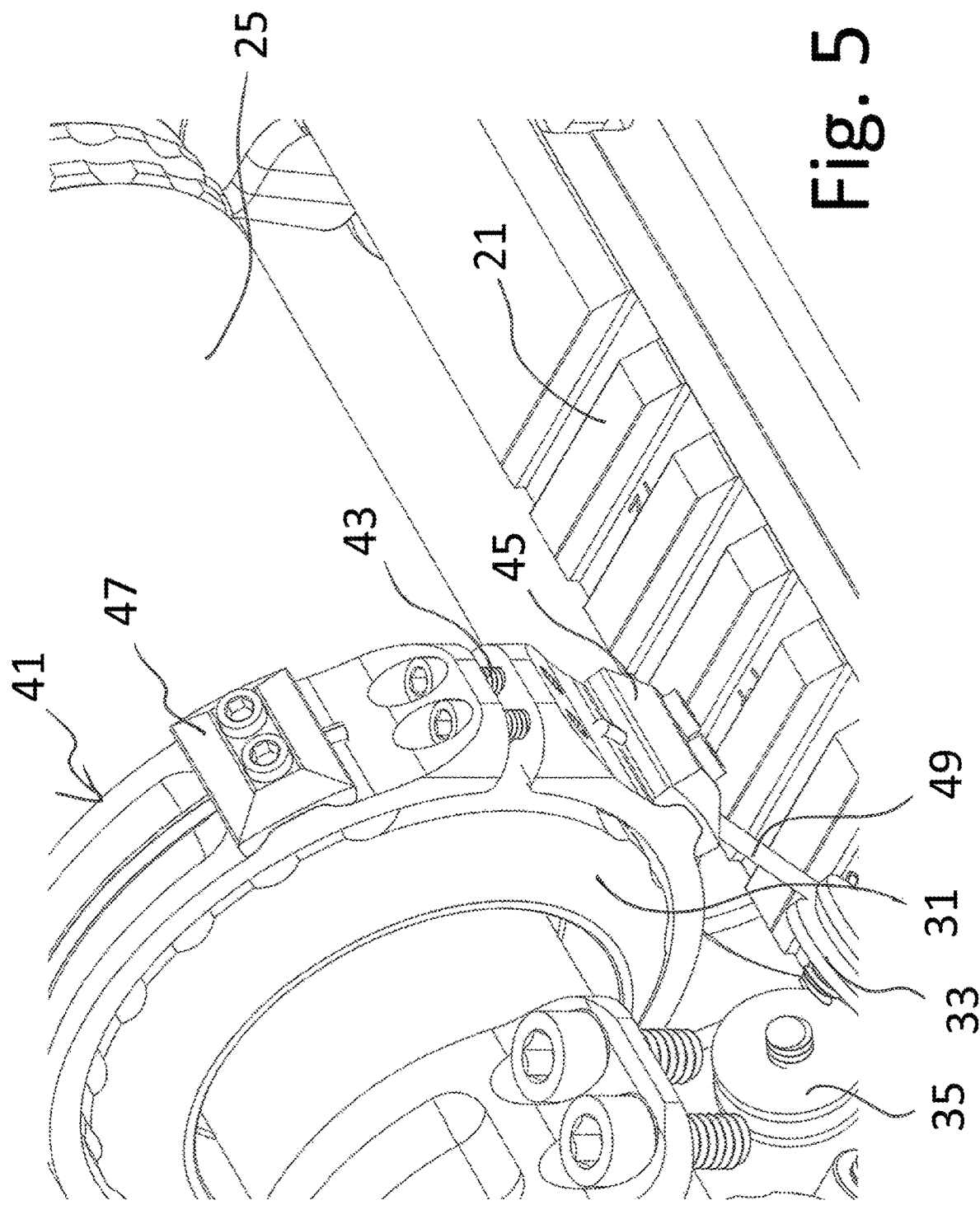
FIG. 5 is an oblique detail view of portions of the apparatus of FIG. 1.

In the specification, reference may be made to the spatial relationships between various aspects of components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges manually operated and electric versions of an apparatus for remotely adjusting scope magnification.

FIGS. 1 through 5 illustrate a firearm 11 incorporating an embodiment of a manually operated adjuster 13 according to this disclosure. Firearm 11 comprises a receiver 15, a buttstock 17, and a forend 19 shrouding a barrel. A rear accessory rail 21 is located on the top of receiver 15, and a forward accessory rail 23 is located on the top of forend 19. An adjustable-magnification scope 25 is mounted on rear rail 21 using a scope mount 27 and scope rings 29. The magnification of scope 25 is adjusted by rotating adjustment ring 31.

In this embodiment, a pulley system provides for manual remote control of rotation of ring 31. Mount 27 comprises a pair of angled rear pulleys 33, 35, and a forward slider assembly 37 comprises front pulley 39. A ring adapter 41 is formed as an incomplete ring that is concentrically installed over ring 31 of scope 25 and then pulled tight using fasteners 43, thus ensuring that rotation of adapter 41 causes corresponding rotation of ring 31. Retainers 45, 47 on adapter 41 are configured for retaining opposite ends of cable 49, which extends from retainer 45 down to rear pulley 33, then forward to front pulley 39, then rearward to rear pulley 35, then upward to retainer 47. When either of retainers 45, 47 are rotated away from pulleys 33, 35, cable 49 wraps over a portion of adapter 41.

Slider assembly 37 comprises a housing 51 mounted to forward rail 23, and front pulley 39 is mounted within a forward portion of housing 51. The top of housing 51 has a longitudinal slot 53 formed therein. A slider 55 is configured to grip a portion of cable 49 within housing 51 and translate longitudinally along slot 53. A grip 57 is coupled to slider 55, and translation of grip 57 by a user causes corresponding motion of cable 49 about pulleys 33, 35, 39. This motion of cable 49 causes rotation of ring 41, allowing for remote adjustment of the magnification of scope 25. In the embodiment shown, grip 57 comprises front and rear vertical wings 59, 61 that allow for a user to push or pull against wings 59, 61 when operating adjuster 13 by translating grip 57. A cover 63 extends between mount 27 and housing 51 for enclosing portions of cable 49.

Though cable 49 is shown as a length of cable having free ends, cable may alternatively be formed as a loop that extends around adapter 41. Also, cable 49 may be formed as an assembly of lengths of cable, and slider 55 may be integrated into the assembly of cable 49.

Figure 6:
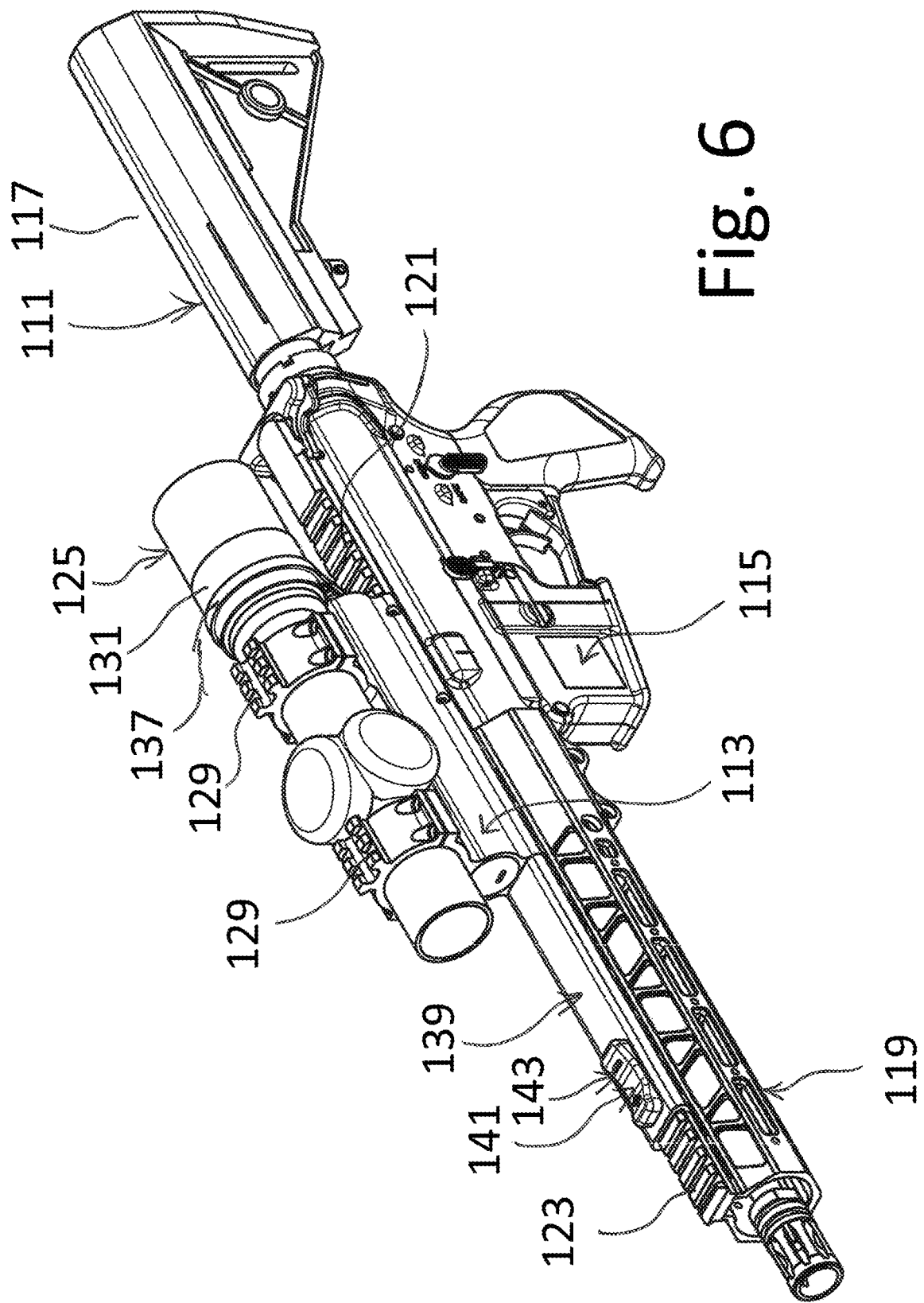
FIG. 6 is an oblique view of a firearm with another embodiment according to this disclosure of an apparatus for remotely adjusting scope magnification.
Figure 7:
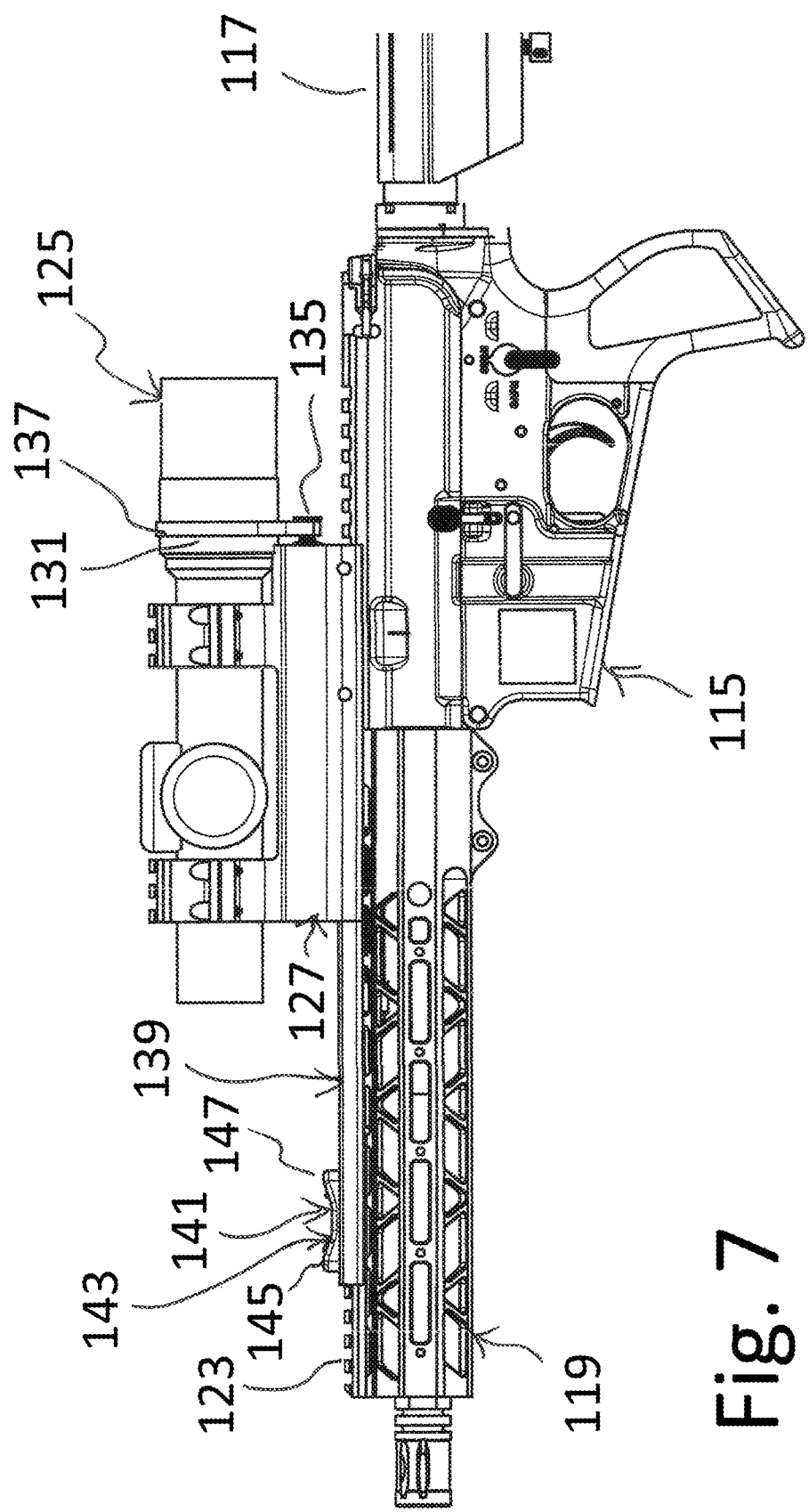
FIG. 7 is a side detail view of portions of the apparatus of FIG. 6.
Figure 8:
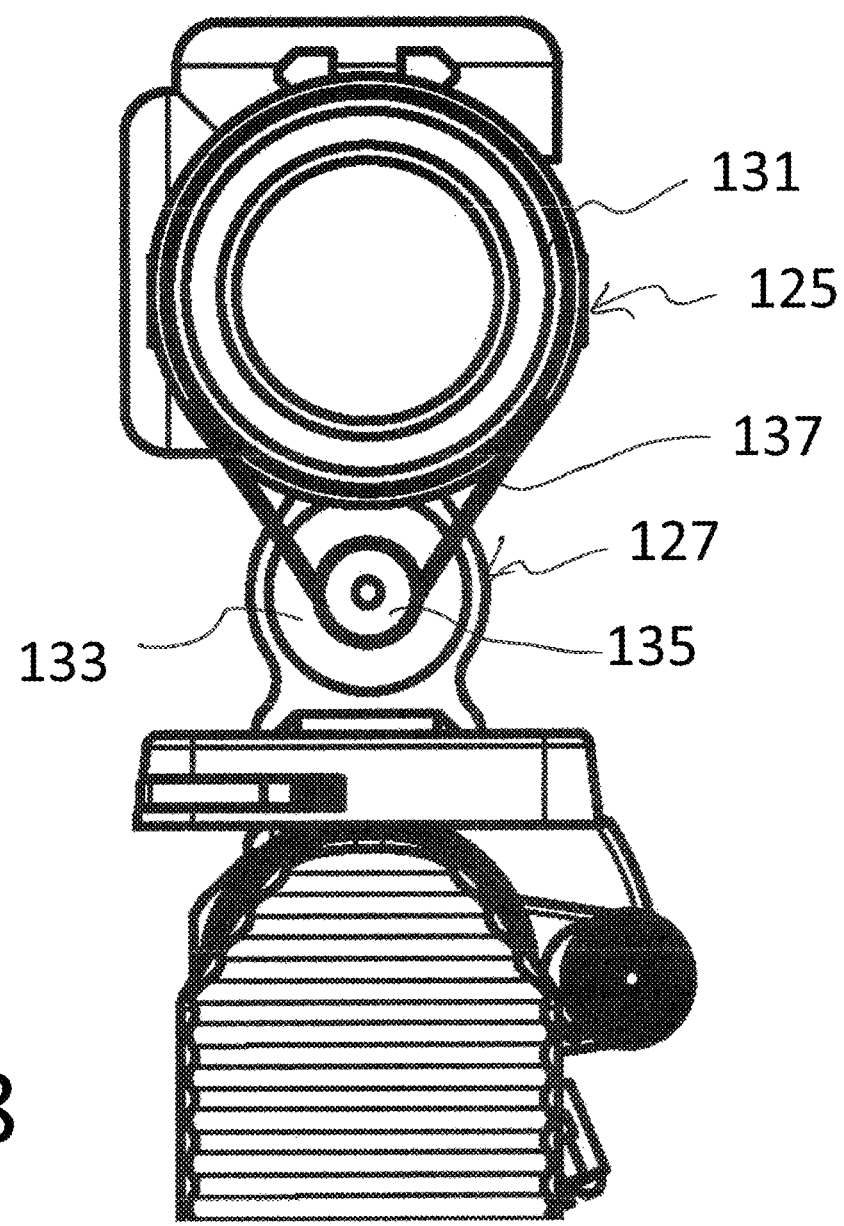
FIG. 8 is a rear detail view of portions of the apparatus of FIG. 6.
Figure 9:
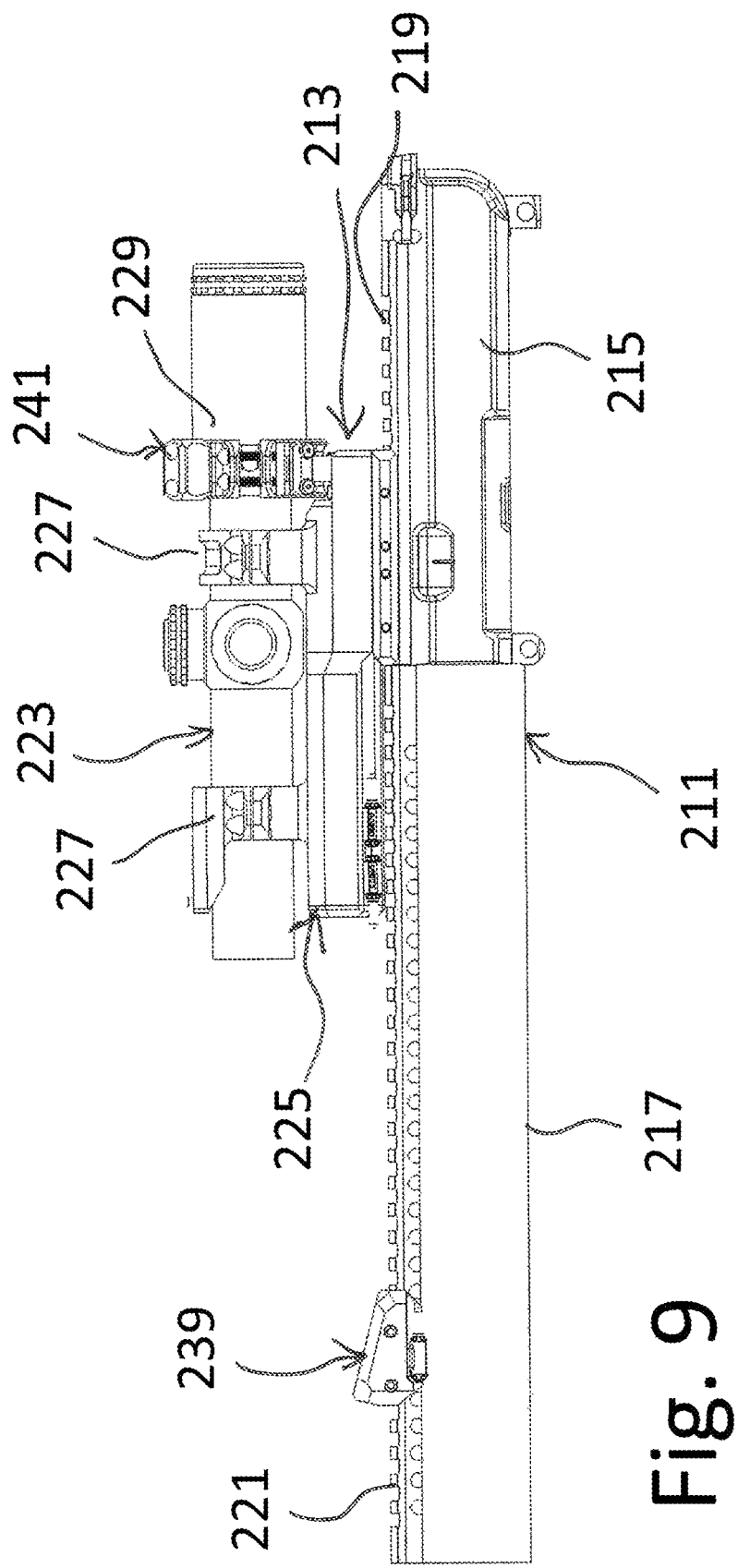
FIG. 9 is a side view of an upper assembly of a firearm with another embodiment of an apparatus according to this disclosure for remotely adjusting scope magnification.
Figure 10:
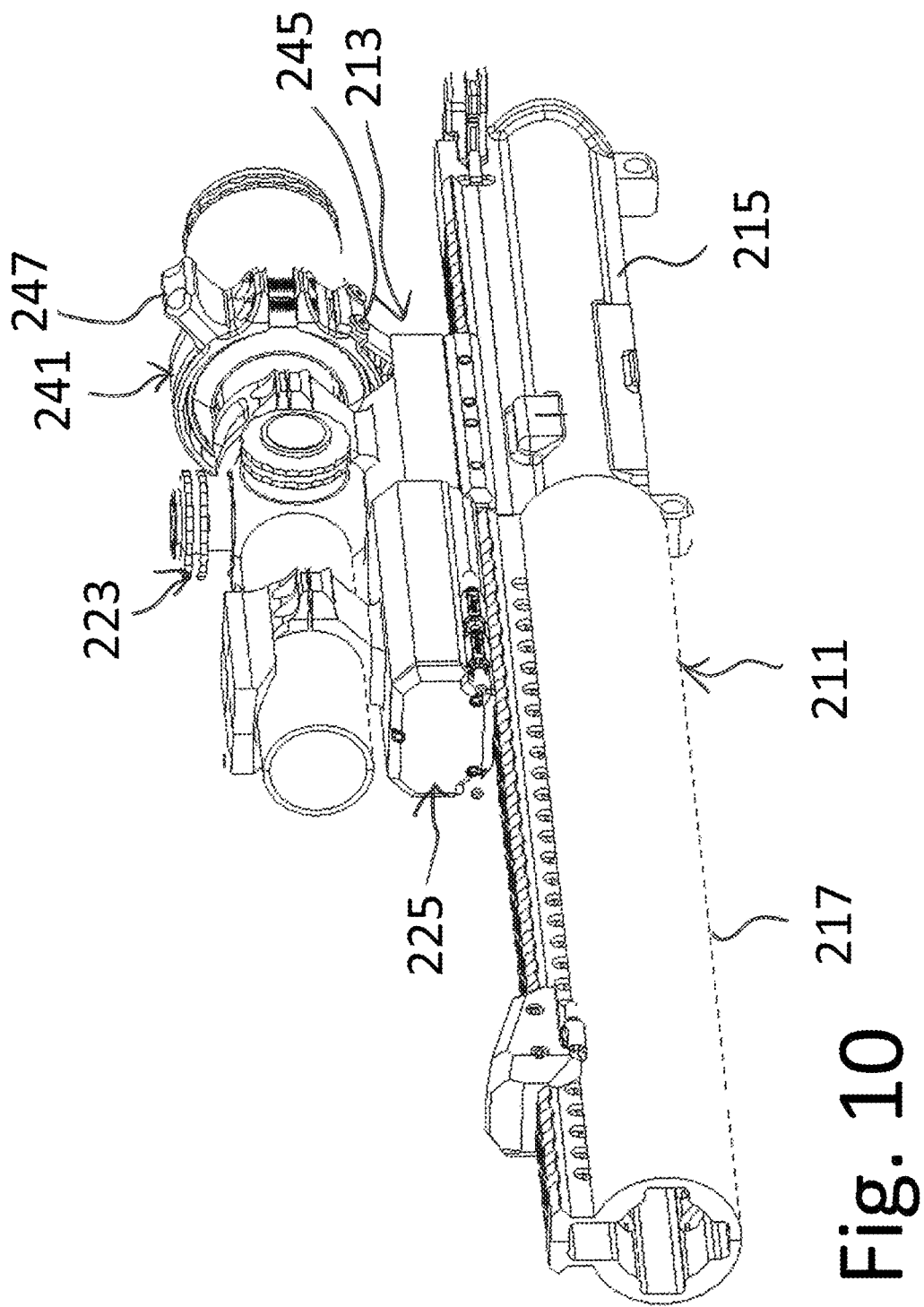
FIG. 10 is an oblique front view of the assembly of FIG. 9.
Figure 11:
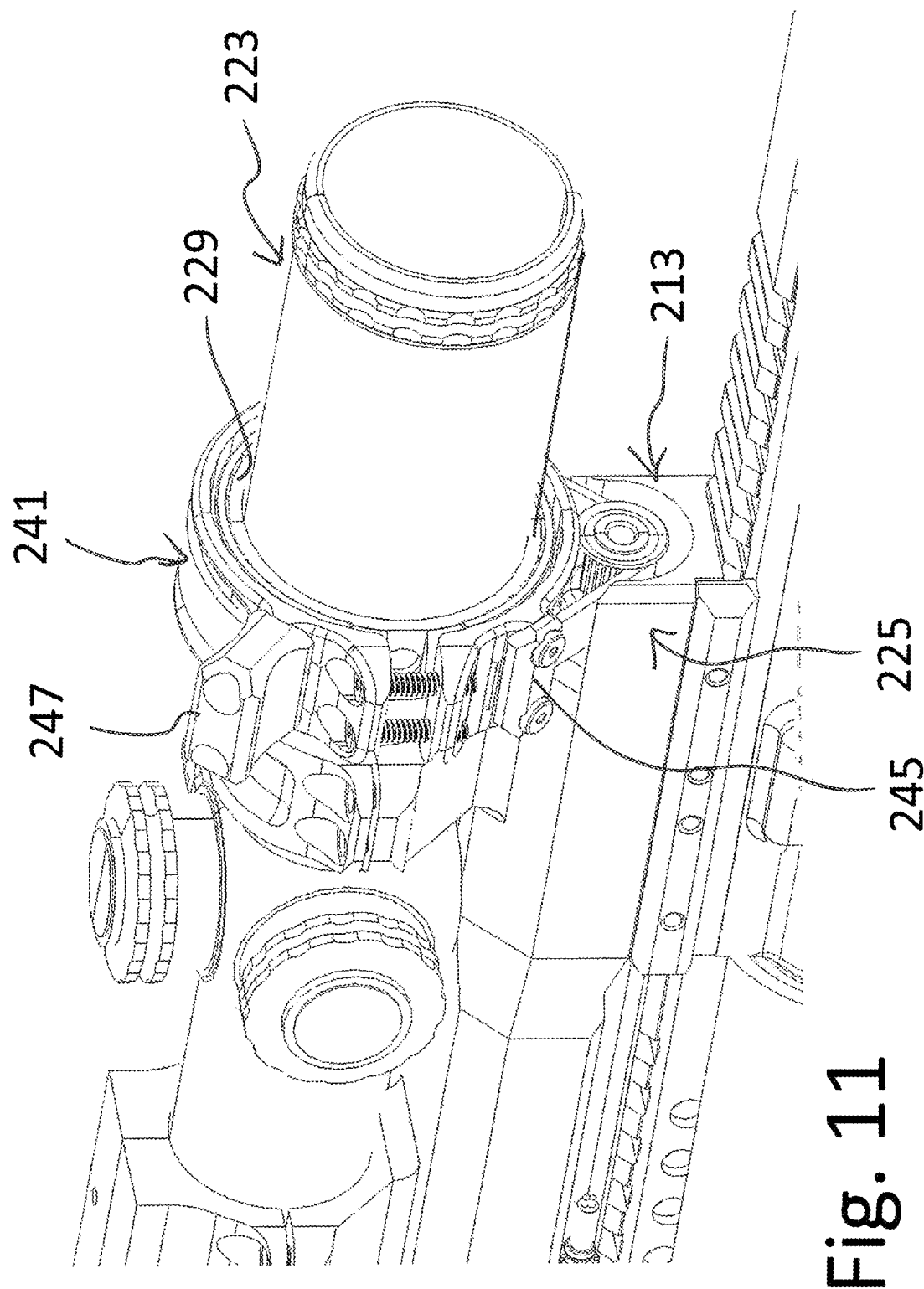
FIG. 11 is an oblique rear view of a portion of the assembly of FIG. 9.
Figure 12:
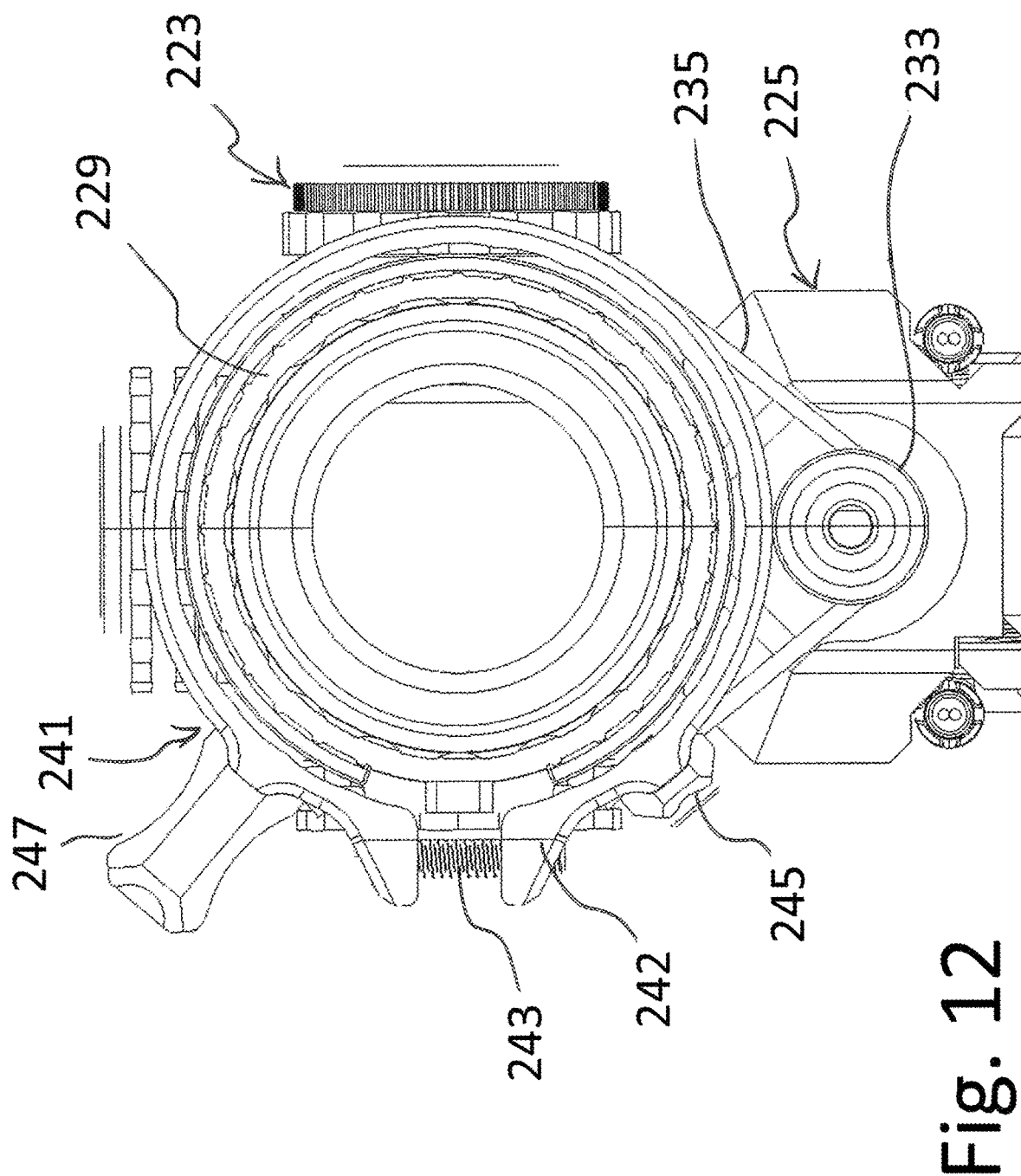
FIG. 12 is a rear view of a portion of the assembly of FIG. 9.
Figure 13:
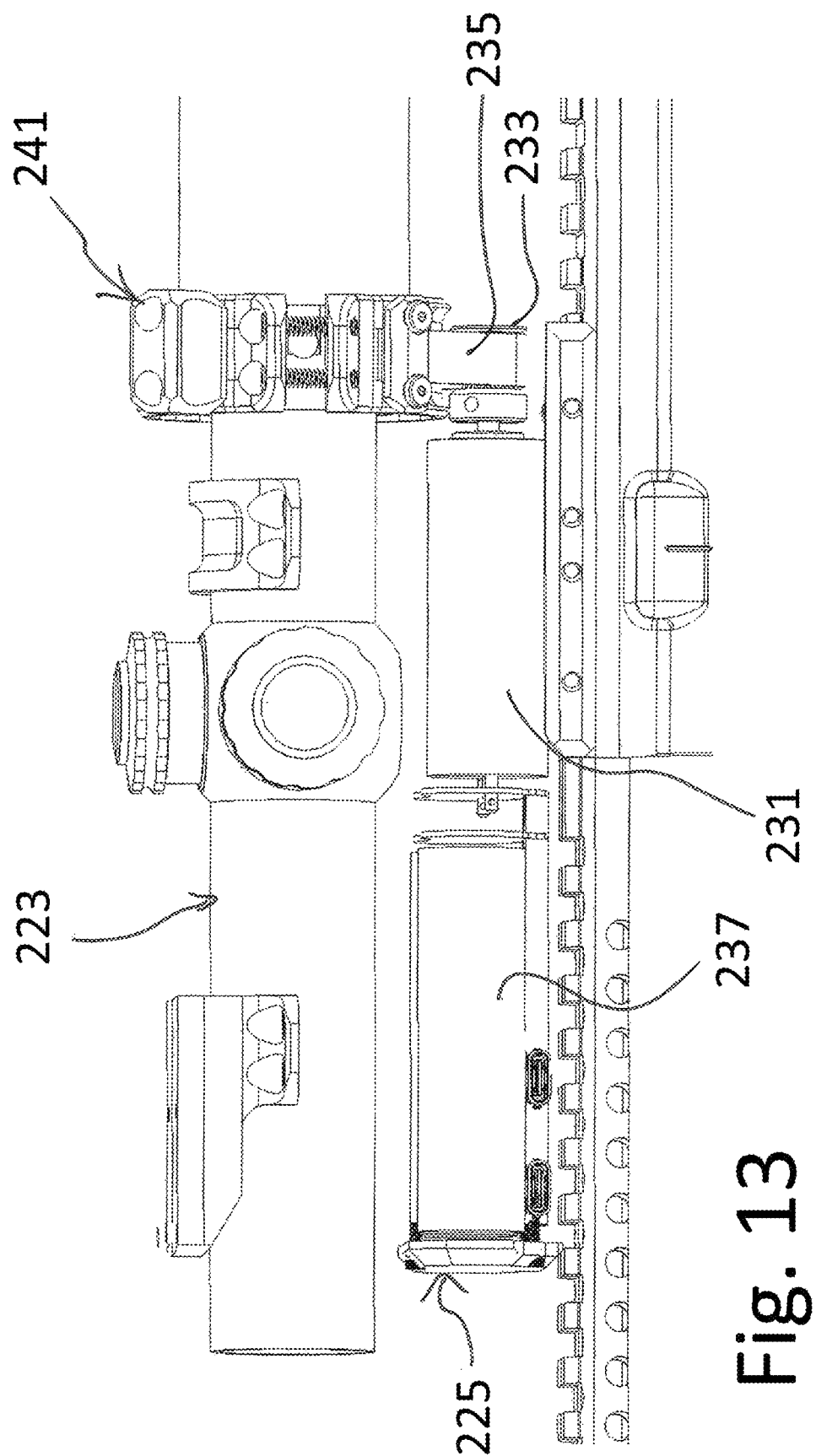
FIG. 13 is a side view of a portion of the assembly of FIG. 9 with components removed for ease of viewing.
Figure 14:
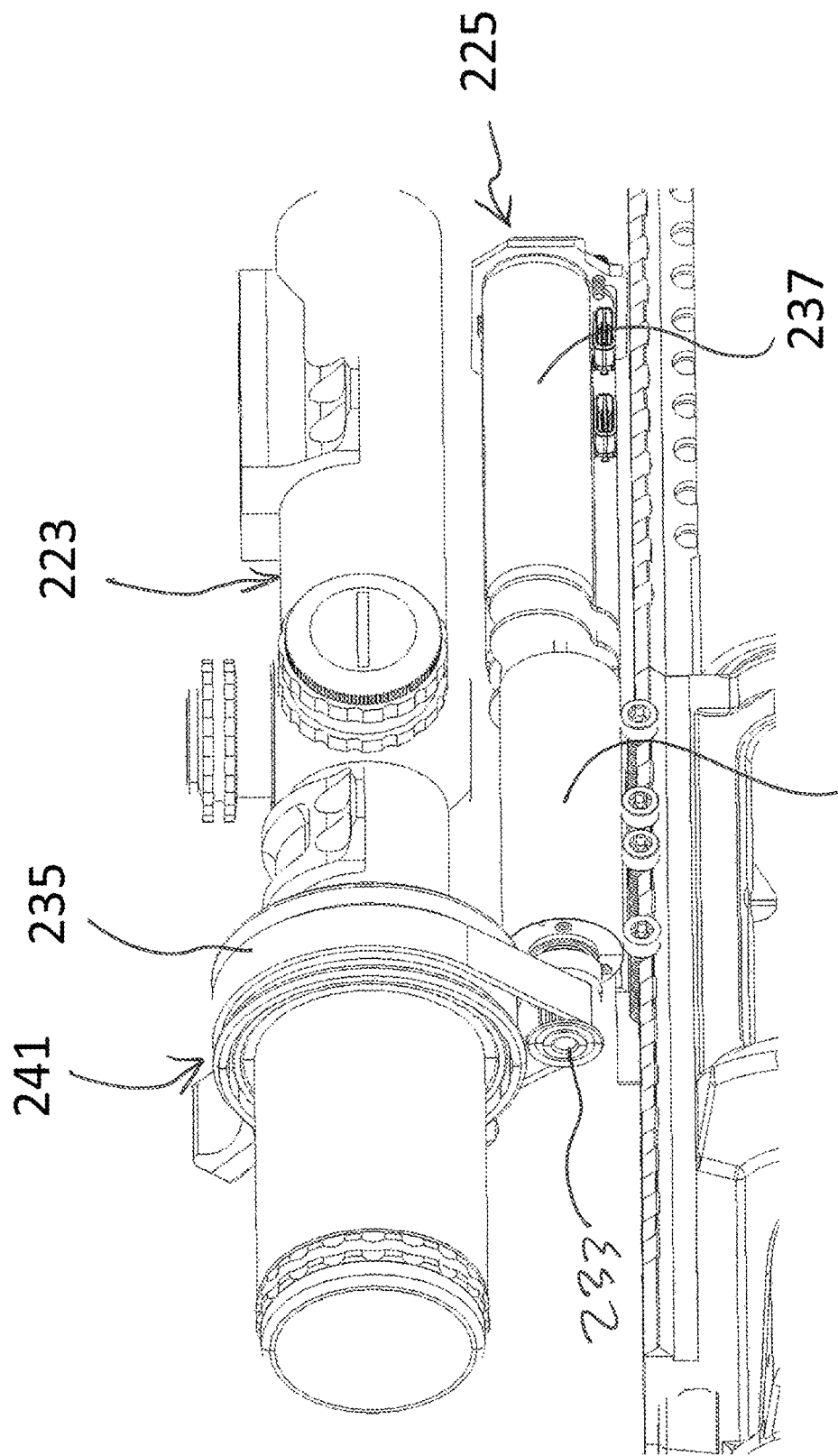
FIG. 14 is an oblique rear view of a portion of the assembly of FIG. 9 with components removed for ease of viewing.

FIGS. 6 through 8 illustrate a firearm 111, which is constructed similarly to firearm 11, and incorporates an embodiment of an electrically operated adjuster 113 according to this disclosure. Firearm 111 comprises a receiver 115, a buttstock 117, and a forend 119 shrouding a barrel. A rear accessory rail 121 is located on the top of receiver 115, and a forward accessory rail 123 is located on the top of forend 119. An adjustable-magnification scope 125 is mounted on rails 121, 123 using a scope mount 127 and scope rings 129. The magnification of scope 125 is adjusted by rotating adjustment ring 131.

In this embodiment, an electric motor system provides for remote control of the rotation of ring 131. Mount 127 comprises an electric motor 133 with a pulley 135, and pulley 135 is coupled to adjustment ring 131 with a belt 137, allowing rotation of motor 133 to cause rotation of ring 131. Though not shown, batteries, circuitry, and/or other components may also be housed within mount 127. A housing 139 mounted to forward rail 123 comprises a switch assembly 141, and a rocker 143 is configured for a user to press a forward portion 145 or a rearward portion 147 to operate motor 133 in a selected direction. Rotation of motor 133 causes rotation of ring 131, allowing for remote adjustment of the magnification of scope 25.

FIGS. 9 through 14 illustrate an upper assembly 211 of a firearm and is similar to the upper assembly of receiver 15 of firearm 11. Assembly 211 incorporates another embodiment of an electrically operated adjuster 213 according to this disclosure. Assembly 211 comprises an upper receiver 215 and a forend 217 for shrouding a barrel. A rear accessory rail 219 is located on the top of upper receiver 215, and a forward accessory rail 221 is located on the top of forend 217. An adjustable-magnification scope 223 is mounted on rails 219, 221 using a scope mount 225 and scope rings 227. The magnification of scope 223 is adjusted by rotating adjustment ring 229.

Like adjuster 113, in this embodiment an electric motor system provides for remote control of the rotation of ring 229. Mount 225 comprises an electric motor 231 with a pulley 233, and pulley 233 is coupled to adjustment ring 229 with a belt 235, allowing rotation of motor 225 to cause rotation of ring 229. Motor 231 is powered by battery 237 housed within mount 225. A housing 239 mounted to forward rail 221 comprises a switch assembly for a user to operate motor 231 in a selected direction.

A ring adapter 241 is constructed similarly to ring adapter 41 and comprises an incomplete ring 242 that is concentrically installed over ring 229 of scope 223 and then pulled tight using fasteners 243, thus ensuring that rotation of adapter 241 causes corresponding rotation of ring 229. A pair of retainers 245, 247 on adapter 241 are configured for retaining opposite ends of belt 235, which extends around pulley 233 between retainers 245, 247. As shown, retainer 247 extends away from ring 242 to act a as a lever for manual operation of adjuster 213. When either of retainers 245, 247 are rotated away from pulley 233, belt 235 wraps over a portion of adapter 241. Thus, rotation of motor 231 causes rotation of ring adapter 241 and adjustment ring 229, allowing for remote adjustment of the magnification of scope 223.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An apparatus for rotating an adjustment ring to adjust the magnification of a scope of a firearm, the apparatus comprising:
    a ring adapter adapted to be coupled to an adjustment ring of a scope;
    a slider assembly adapted to be carried on a portion of a firearm spaced from the adapter, the slider assembly having a slider adapted for longitudinal translation relative to the firearm and having at least one front pulley located forward of the slider;
    a pair of rear pulleys located below the ring adapter; and
    a cable for coupling the slider to the ring adapter, the cable extending from one portion of the ring adapter and around one of the rear pulleys, the cable then extending forward and around the front pulley and then rearward and around the other of the rear pulleys to another portion of the ring adapter;
    wherein the slider is coupled to the cable, so that translation of the slider causes motion of the cable about the pulleys and corresponding rotation of the ring adapter.

2. The apparatus of claim 1, wherein the adapter ring is formed as an incomplete ring that is adapted to be concentrically installed over an adjustment ring of a scope.

3. The apparatus of claim 1, wherein retainers on the adapter ring retain opposite ends of the cable.

4. The apparatus of claim 1, wherein the slider assembly comprises a housing adapted to be mounted to an accessory rail of a firearm.

5. The apparatus of claim 1, further comprising:
    a cover located between the slider assembly and the rear pulleys for covering at least a portion of the cable.

6. The apparatus of claim 1, wherein the slider forms a portion of the cable.

* * * * *